US012720257B2

(12) United States Patent
Fu et al.

(10) Patent No.: US 12,720,257 B2
(45) Date of Patent: Aug. 25, 2026

(54) SOUND RECORDING METHOD AND RELATED DEVICE

(71) Applicant: HUAWEI TECHNOLOGIES CO., LTD., Shenzhen (CN)

(72) Inventors: Jiali Fu, Shenzhen (CN); Huimin Zhang, Shenzhen (CN); Xueyan Huang, Shenzhen (CN); Mingjie Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 209 days.

(21) Appl. No.: 18/455,731

(22) Filed: Aug. 25, 2023

(65) Prior Publication Data

US 2023/0403504 A1 Dec. 14, 2023

Related U.S. Application Data

(63) Continuation of application No. PCT/CN2022/076944, filed on Feb. 18, 2022.

(30) Foreign Application Priority Data

Feb. 26, 2021 (CN) ........................ 202110220932.7

(51) Int. Cl.
*H04R 3/00* (2006.01)

(52) U.S. Cl.
CPC ......... *H04R 3/005* (2013.01); *H04R 2499/13* (2013.01)

(58) Field of Classification Search
CPC ........... H04M 1/6008; H04M 1/72454; H04M 2250/52; H04R 3/005; H04R 2420/01; H04R 2499/11; H04R 2499/13; G01S 5/02585; G01S 5/16; H04S 2400/15
USPC ............................................................ 381/86
See application file for complete search history.

(56) References Cited

U.S. PATENT DOCUMENTS

| | | | | |
|---|---|---|---|---|
| 9,274,744 | B2 | 3/2016 | Hart et al. | |
| 2010/0026780 | A1* | 2/2010 | Tico | H04N 7/142 348/14.02 |
| 2011/0085061 | A1 | 4/2011 | Kim | |
| 2012/0062729 | A1* | 3/2012 | Hart | H04N 7/142 348/135 |
| 2013/0343572 | A1 | 12/2013 | Lee et al. | |
| 2016/0249134 | A1* | 8/2016 | Wang | H04R 3/005 |
| 2017/0055072 | A1* | 2/2017 | Kim | H04N 23/611 |

FOREIGN PATENT DOCUMENTS

| | | | |
|---|---|---|---|
| CN | 102165521 | A | 8/2011 |
| CN | 103456305 | A | 12/2013 |
| CN | 104270489 | A | 1/2015 |

(Continued)

OTHER PUBLICATIONS

PCT International Search Report for Application No. PCT/CN2022/076944 dated Feb. 18, 2022, 10 pages.

(Continued)

*Primary Examiner* — Paul Kim

(57) ABSTRACT

The technology of this application relates to a sound recording method and a related device. The sound recording method includes performing a shooting operation on a subject, determining an attribute of the subject, selecting a target microphone from a sound pickup assembly based on the attribute of the subject, and performing sound recording on the subject using the target microphone.

15 Claims, 11 Drawing Sheets

(56) References Cited

FOREIGN PATENT DOCUMENTS

| | | | |
|---|---|---|---|
| CN | 105611458 | A | 5/2016 |
| CN | 108769400 | A | 11/2018 |
| CN | 110858943 | A | 3/2020 |
| CN | 111050269 | A | 4/2020 |
| CN | 111077496 | A | 4/2020 |
| CN | 113099031 | A | 7/2021 |

OTHER PUBLICATIONS

Office Action for Chinese Application No. 2021102209327 dated Feb. 26, 2021, 7 pages.

Extended European Search Report for EP Application No. 22758817.5 dated Jun. 17, 2024, 10 pages.

* cited by examiner

Shooting terminal

SOUND RECORDING METHOD AND RELATED DEVICE

CROSS-REFERENCE TO RELATED APPLICATIONS

This application is a continuation of International Application No. PCT/CN2022/076944, filed on Feb. 18, 2022, which claims priority to Chinese Patent Application No. 202110220932.7, filed on Feb. 26, 2021. The disclosures of the aforementioned applications are hereby incorporated by reference in their entireties

TECHNICAL FIELD

Embodiments of this application relate to the field of terminal technologies, and in particular, to a sound recording method and a related device.

BACKGROUND

A microphone is one of several indispensable components of an electronic device. As shown in FIG. 1, a plurality of microphones are provided at different positions of a mobile phone.

Generally, the plurality of microphones may be all turned on and pick up a sound at the same time, or may be all turned off. Different audio signals are acquired due to different positions at which the microphones are located. For example, when a user records a sound using microphones, a sound recorded by a microphone closer to a sound source is clearer, while a sound recorded by a microphone farther away from the sound source is prone to include more noise. How to reduce noise in a recording is very important for the quality of audio recording.

SUMMARY

Embodiments of this application disclose a sound recording method and a related device, so that a target microphone can be selected based on an attribute of a subject, thereby improving sound recording quality.

A first aspect of this application relates to a sound recording method applied to an electronic device. The sound recording method includes: performing a shooting operation on a subject; determining an attribute of the subject; selecting a target microphone from a sound pickup assembly based on the attribute of the subject; and performing sound recording on the subject using the target microphone.

In this embodiment of this application, the target microphone can be selected based on the attribute of the subject, thereby avoiding recording an unwanted sound and improving sound recording quality.

In some optional implementations, the attribute of the subject includes a first position attribute of the subject relative to the electronic device, an orientation attribute of the subject relative to the electronic device, a second position attribute of the electronic device, and/or a type attribute of the subject.

This technical solution allows the target microphone to be selected based on one or more attributes, thereby improving scene adaptability of the sound recording method.

In some optional implementations, the first position attribute includes coordinates of the subject or a straight-line distance between the subject and each microphone in the sound pickup assembly.

This technical solution allows for a method for calculating the first position attribute.

In some optional implementations, if the first position attribute is the coordinates of the subject, the determining an attribute of the subject includes: shooting a first image of the subject using a shooting unit of the electronic device; determining a second image of the subject based on the first image, where the first image includes the second image; measuring, based on a camera coordinate system, a first distance between a camera of the shooting unit and the subject, where the camera coordinate system is a three-dimensional coordinate system that uses an optical center of the camera of the shooting unit as an origin and uses a principal axis as a Z-axis, a plane of the first image is parallel to an XY plane of the camera coordinate system, and an image center point of the first image is on the Z-axis of the camera coordinate system; obtaining a focal length of the camera; and calculating the coordinates of the subject in the camera coordinate system based on the first distance, the focal length, and the second image.

This technical solution allows for the calculation of the coordinates of the subject.

In some optional implementations, the determining a second image of the subject based on the first image includes: receiving an object selection operation performed by a user on the first image; and marking, in the first image, an image of an object selected by the user as the second image of the subject.

This technical solution allows the second image of the subject to be marked in the first image including the scene and the subject, so as to obtain the second image including only the subject.

In some optional implementations, the determining a second image of the subject based on the first image includes: performing object detection and/or scene detection on the first image to obtain the second image of the subject.

This technical solution allows the second image of the subject to be detected in the first image including the scene and the subject, so as to obtain the second image including only the subject.

In some optional implementations, if the first position attribute is the straight-line distance between the subject and each microphone in the sound pickup assembly, the determining an attribute of the subject includes: obtaining the coordinates of the subject and coordinates of each microphone in the sound pickup assembly in the camera coordinate system; and calculating the straight-line distance between the subject and each microphone in the sound pickup assembly based on the coordinates of the subject and the coordinates of each microphone in the sound pickup assembly.

This technical solution allows for the calculation of the straight-line distance between the subject and each microphone in the sound pickup assembly. Further, an average value of a plurality of straight-line distances is calculated, and the average value of the plurality of straight-line distances is used as the attribute of the subject.

In some optional implementations, if the attribute of the subject is the orientation attribute, the determining an attribute of the subject includes: determining the orientation attribute of the subject based on a camera that performs the shooting operation on the subject.

This technical solution allows for the determining of the orientation attribute. For example, if the electronic device performs the shooting operation on the subject by using a front-facing camera, it is determined that the subject is located on the front side of the electronic device.

In some optional implementations, if the attribute of the subject is the type attribute, the determining an attribute of the subject includes: creating or obtaining a preset type list; and searching the preset type list for the type attribute of the subject, where the type attribute of the subject includes an audible type or a silent type.

This technical solution allows the type attribute of the subject to be determined based on the preset type list.

In some optional implementations, if the subject is a person, the searching the preset type list for the type attribute of the subject includes: determining whether a sound producing movement of the person is detected; and if a sound producing movement of the person is detected, determining that the type attribute of the subject is the audible type; or if no sound producing movement of the person is detected, and a type attribute of the person in the preset type list is the silent type, determining that the type attribute of the subject is the silent type.

This technical solution allows the type attribute of the person to be determined based on the sound producing movement of the person.

In some optional implementations, if the attribute of the subject is the type attribute, the determining an attribute of the subject includes: determining the type attribute of the subject based on the second position attribute.

This technical solution allows for a method for determining the type attribute of the subject.

In some optional implementations, the selecting a target microphone from a sound pickup assembly based on the attribute of the subject includes: selecting the target microphone from the sound pickup assembly based on the first position attribute of the subject; or selecting the target microphone from the sound pickup assembly based on the electronic device of the subject; or selecting the target microphone from the sound pickup assembly based on the type attribute of the subject; or selecting the target microphone from the sound pickup assembly based on the orientation attribute of the subject.

This technical solution allows for the selection of the target microphone.

In some optional implementations, the selecting a target microphone from a sound pickup assembly based on the attribute of the subject includes: obtaining a first side corresponding to a camera that performs the shooting operation on the subject; and selecting, from the sound pickup assembly, a microphone on the same side as the first side as the target microphone.

This technical solution allows the target microphone to be selected based on the camera.

In some optional implementations, the selecting a target microphone from a sound pickup assembly based on the attribute of the subject includes: obtaining a first side corresponding to a camera that performs the shooting operation on the subject; determining, from the sound pickup assembly, a side other than the opposite side of the first side as a second side; and selecting a microphone on the same side as the second side as the target microphone.

This technical solution allows the target microphone to be selected based on the camera.

In some optional implementations, the selecting a target microphone from a sound pickup assembly based on the attribute of the subject includes: selecting the target microphone from the sound pickup assembly based on the first position attribute and the orientation attribute of the subject.

This technical solution allows for the selection of the target microphone.

In some optional implementations, the selecting the target microphone from the sound pickup assembly based on the first position attribute and the orientation attribute of the subject includes: selecting a first microphone group from the sound pickup assembly based on the first position attribute of the subject; obtaining a first volume of noise and a second volume of the subject using the first microphone group; if the first volume is greater than or equal to the second volume, determining, based on the orientation attribute of the subject, a first side corresponding to a camera that performs the shooting operation on the subject, determining a third side corresponding to the noise relative to the electronic device, and determining a side other than the third side as a fourth side; and selecting, from the first microphone group, a microphone on the same side as the first side or a microphone on the same side as the third side.

This technical solution allows the target microphone to be selected based on a plurality of attributes, thereby improving accuracy of selecting the target microphone.

In some optional implementations, the selecting a target microphone from a sound pickup assembly based on the attribute of the subject includes: displaying a microphone control interface; and in response to a turn-on operation on a microphone control icon in the microphone control interface, selecting, from the sound pickup assembly based on the attribute of the subject, a target microphone corresponding to a microphone control icon in an on state.

This technical solution allows the target microphone to be selected based on the operation by the user.

In some optional implementations, the performing sound recording on the subject using the target microphone includes: displaying a microphone control interface; performing on/off control on the target microphone or the sound pickup assembly according to a control operation on the target microphone or the sound pickup assembly; and performing sound recording on the subject using the target microphone or the sound pickup assembly in an on state.

This technical solution allows for recording using the target microphone according to the control of the user.

In some optional implementations, the performing sound recording on the subject using the target microphone includes: if the subject is a person, extracting a face image of the person; calculating a target similarity between the face image of the person and a preset face image stored in the electronic device; and if the target similarity is greater than a preset similarity, performing sound recording on the subject using the target microphone.

This technical solution avoids recording an unwanted sound of a person, thereby improving recording accuracy.

In some optional implementations, during the performing sound recording on the subject using the target microphone, the sound recording method further includes: determining a to-be-suppressed sound based on the subject and/or a shooting scene; and filtering out the to-be-suppressed sound.

This technical solution can improve sound recording quality.

In some optional implementations, during the performing sound recording on the subject using the target microphone, the sound recording method further includes: determining a sound of the subject; determining whether a sound acquired is the sound of the subject; and if the sound acquired is not the sound of the subject, filtering out the sound acquired.

This technical solution allows the sound acquired to be further filtered, thereby improving quality of the sound acquired.

In some optional implementations, during the performing sound recording on the subject using the target microphone, the sound recording method further includes: obtaining a preset to-be-suppressed sound; determining whether a sound acquired matches the preset to-be-suppressed sound; and if the sound acquired matches the preset to-be-suppressed sound, filtering out the sound acquired.

This technical solution allows the sound acquired to be filtered based on the preset to-be-suppressed sound, thereby improving quality of the sound acquired.

In some optional implementations, during the performing sound recording on the subject using the target microphone, the sound recording method further includes: obtaining a preset frequency range; determining whether a frequency of a sound acquired exceeds the preset frequency range; and if the frequency of the sound acquired exceeds the preset frequency range, filtering out the sound acquired.

This technical solution allows the sound acquired to be filtered based on the preset frequency range, thereby improving quality of the sound acquired.

In some optional implementations, after the performing sound recording on the subject using the target microphone, the sound recording method further includes: performing sound synthesis on audio signals acquired by a plurality of microphones in the target microphones.

This technical solution allows for the sound synthesis on the sounds acquired by the plurality of microphones.

A second aspect of this application relates to a sound recording method applied to an electronic device communicatively connected to a plurality of sound pickup electronic devices. The sound recording method includes: performing a shooting operation on a subject; determining an attribute of the subject; selecting a target sound pickup assembly from a plurality of sound pickup assemblies of the plurality of sound pickup electronic devices based on the attribute of the subject; and performing sound recording on the subject using the target sound pickup assembly.

In this embodiment of this application, the target sound pickup assembly can be selected from the plurality of sound pickup assemblies of the plurality of sound pickup electronic devices, thereby improving sound recording quality in an application scenario of a plurality of sound pickup electronic devices.

In some optional implementations, the selecting a target sound pickup assembly from a plurality of sound pickup assemblies of the plurality of sound pickup electronic devices based on the attribute of the subject includes: obtaining distances between the subject and the plurality of sound pickup electronic devices based on a position of the subject; and selecting, from the sound pickup assemblies of the plurality of sound pickup electronic devices, a sound pickup assembly closest to the subject.

This technical solution allows for the selection of the target sound pickup assembly, so that the selected target sound pickup assembly is closest to the subject.

In some optional implementations, if a vehicle is used as a sound pickup electronic device, the selecting a target sound pickup assembly from a plurality of sound pickup assemblies of the plurality of sound pickup electronic devices based on the attribute of the subject includes: determining a heading direction of the vehicle based on positioning information of the electronic device; determining a shooting direction of the electronic device based on a motion sensor; determining a sound pickup direction of the vehicle based on the heading direction and the shooting direction; and determining, based on the sound pickup direction, a target sound pickup assembly corresponding to the sound pickup direction.

This technical solution allows the target sound pickup assembly to be selected based on the heading direction of the vehicle and the shooting direction of the electronic device.

In some optional implementations, the attribute of the subject includes a first position attribute of the subject, and the sound recording method further includes: obtaining a mapping table of a preset position and a sound pickup device; and querying the mapping table of a preset position and a sound pickup device for a sound pickup electronic device based on a position attribute value of the first position attribute.

This technical solution allows the sound pickup electronic device to be queried based on the mapping table of a preset position and a sound pickup device.

In some optional implementations, the sound recording method further includes: obtaining an order of the plurality of sound pickup electronic devices in a preset sound pickup device list; and selecting a microphone of one electronic device from microphones of the plurality of sound pickup electronic devices according to the order of the plurality of sound pickup electronic devices.

This technical solution allows for the selection of the microphone of the electronic device.

In some optional implementations, after the performing sound recording on the subject using the target sound pickup assembly, the sound recording method further includes: combining, into a video file, an audio signal acquired by the target sound pickup assembly and a video signal captured by a shooting unit.

This technical solution allows for synthesis of the audio signal and the video signal, so as to generate the video file.

A third aspect of this application relates to an electronic device including a processor and a memory. The memory is configured to store instructions. The processor is configured to invoke the instructions in the memory, to cause the electronic device to perform the sound recording method.

A fourth aspect of this application relates to a computer-readable storage medium. The computer-readable storage medium stores at least one instruction, and when the at least one instruction is executed by a processor, the sound recording method is implemented.

For technical effects brought by the second aspect to the fourth aspect, refer to the method related descriptions in the foregoing method part.

DESCRIPTION OF EMBODIMENTS

For ease of understanding, some concepts related to embodiments of this application are described as examples for reference.

It should be noted that, in embodiments of this application, "at least one" means one or more, and "a plurality of" means two or more. "And/or" describes an association relationship between associated objects, and represents that at least three relationships may exist. For example, A and/or B may represent the following cases: Only A exists, both A and B exist, and only B exists, where A and B may be singular or plural. In the specification, claims, and accompanying drawings of this application, the terms "first", "second", "third", "fourth", and the like (if existent) are intended to distinguish between similar objects but do not indicate a specific order or sequence.

A sound recording method is applied to an electronic device. The electronic device may include a shooting terminal, a video recording electronic device, a monitoring electronic device, and the like. The shooting terminal may include a mobile phone, a tablet computer, a notebook computer, an Ultra-mobile Personal Computer (UMPC), a netbook, a Personal Digital Assistant, (PDA), and the like.

Figure 1:
FIG. 1 is an example schematic diagram of an electronic device for performing a sound recording method according to an embodiment of this application.

FIG. 1 is a schematic diagram of an electronic device for performing a sound recording method according to an embodiment of this application. As shown in FIG. 1, the electronic device includes a plurality of microphones. For example, the electronic device includes an earpiece/front microphone located at an earpiece position, the electronic device includes a bottom microphone located at a bottom position, and the electronic device includes a rear microphone located at a rear-facing camera position. The rear microphone may be located inside the electronic device.

To better understand the sound recording method and the related device disclosed in embodiments of this application, an application scenario of the sound recording method in this application is first described below.

Figure 2A:
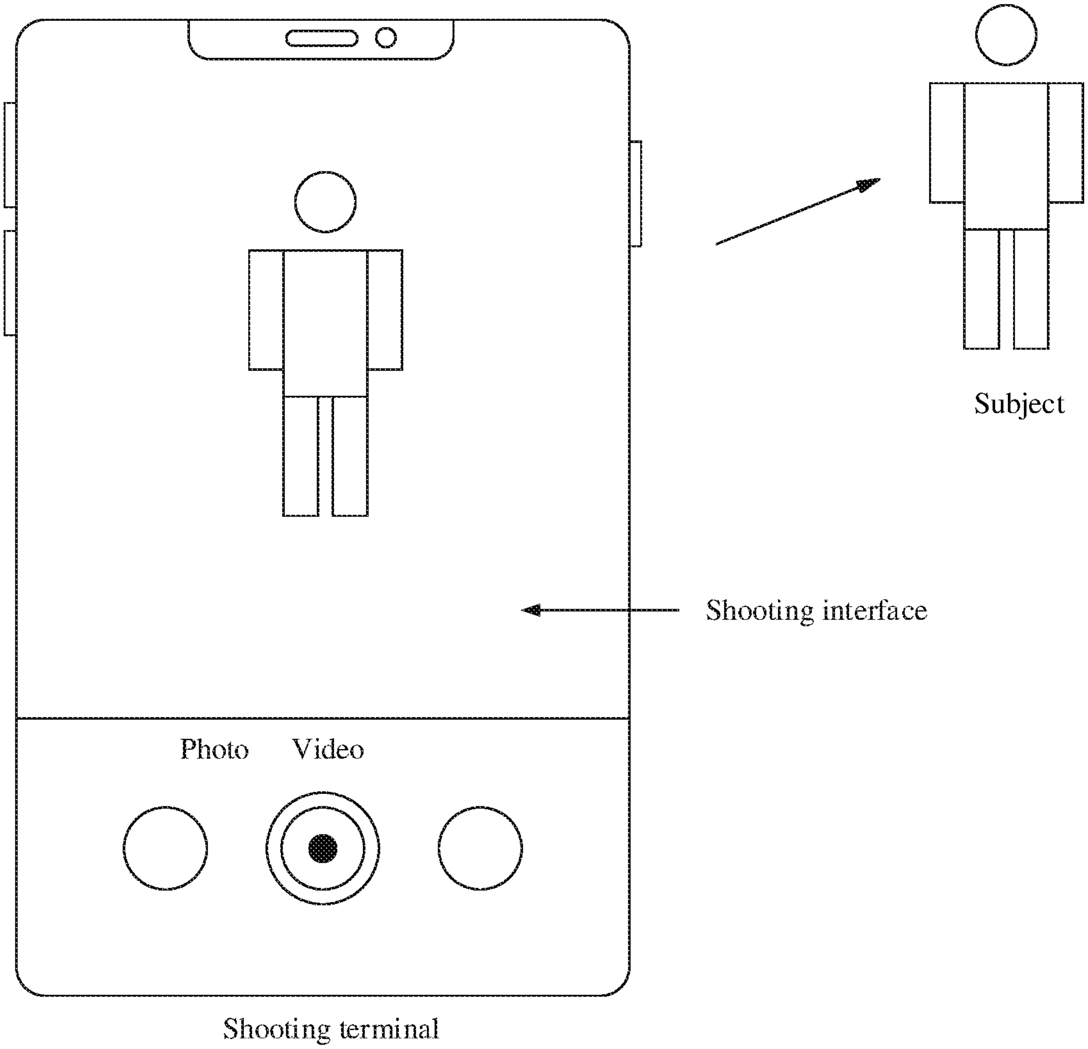
FIG. 2A and FIG. 2B are example schematic diagrams of an application scenario of a sound recording method according to an embodiment of this application.
Figure 2B:
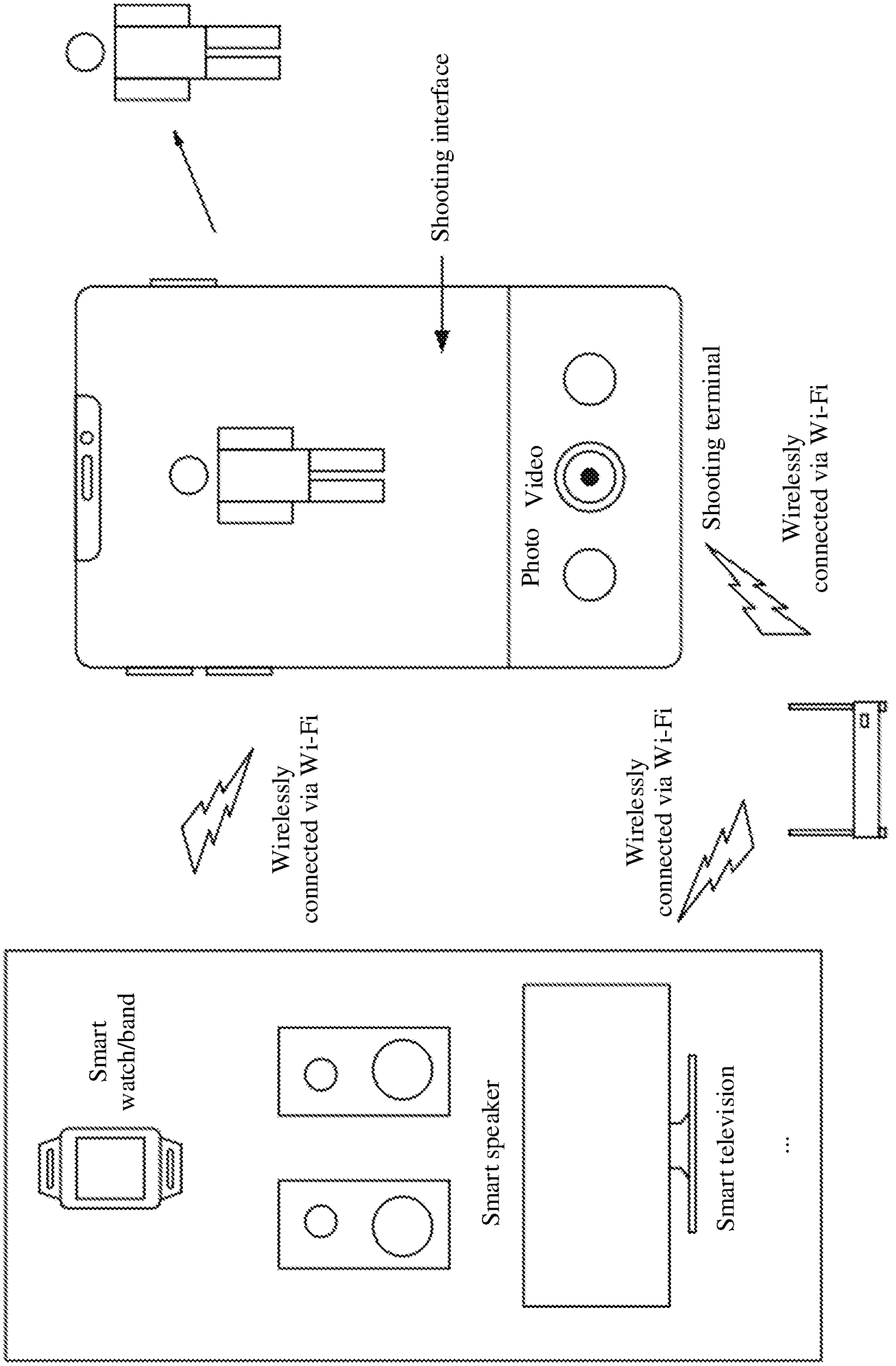

FIG. 2A and FIG. 2B are schematic diagrams of an application scenario of a sound recording method according to an embodiment of this application.

As shown in FIG. 2A, a user may perform a shooting operation on a subject using the shooting terminal. To be specific, the electronic device performs audio and video recording on the subject in response to the shooting operation by the user.

As shown in FIG. 2B, the electronic device may establish a communication connection to a sound pickup electronic device such as a smart watch, a smart band, a smart speaker, or a smart television via a router. The electronic device is a shooting terminal, and the electronic device may establish a Wi-Fi connection to the sound pickup electronic device.

Figure 3:
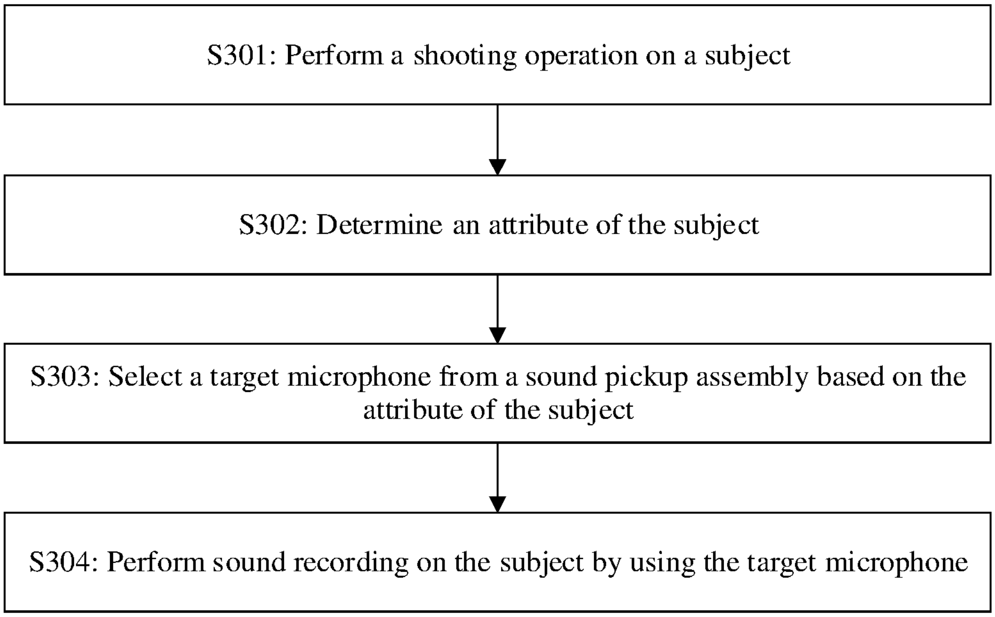
FIG. 3 is an example flowchart of a sound recording method according to an embodiment of this application.

FIG. 3 is a flowchart of a sound recording method according to an embodiment of this application. The sound recording method is applied to an electronic device, and specifically includes the following steps.

S301: Perform a shooting operation on a subject.

The electronic device may obtain a first image through a shooting unit, and perform image recognition on the first image obtained by the shooting unit, to obtain a second image of the subject in the first image. The first image is an image of a scene in which the subject is located, and includes the subject. The second image is an image of the subject that is captured from the first image.

In this embodiment provided in this application, when the user is to perform video recording on the subject, the shooting unit of the electronic device may be turned on to perform a pre-shooting operation on the subject, to obtain the first image including the subject. The shooting unit may include one or more cameras, for example, a front-facing camera or a rear-facing camera. The subject may be a person, an animal, or another sound source that can produce a sound.

Optionally, the electronic device may take the first image including the subject, receive an object selection operation performed by the user on the first image, and mark, in the first image, an image of an object selected by the user as the second image. For example, if the first image taken includes a plurality of persons, the electronic device detects a target person selected by the user, determines an image of the target person selected by the user as the second image, and marks the second image in the first image with a rectangular box.

Optionally, the electronic device may take the first image including the subject, and perform object detection and/or scene detection on the first image, to obtain the second image of the subject. Specifically, the electronic device may perform object detection on the first image to obtain a second image of a subject such as a person, an animal, an article, or a plant. The electronic device may perform scene detection on the first image, to obtain a second image of a subject such as a scenery or a building.

Optionally, the electronic device may detect the second image of the subject from the first image by using an object detection or tracking algorithm. Specifically, during an initialization phase of the subject, the electronic device may automatically detect the moving subject (for example, obtain the second image of the subject by comparing the first image with a fixed background). Alternatively, the electronic device marks the subject through receiving a marking operation by the user, for example, may use an initial box to bound the subject. After the initial box of the subject is obtained, a feature of the subject is extracted. An object description model is constructed based on the feature of the subject, where the object description model may be classified into a generative model and a discriminative model. The second image of the subject is detected by using the target description model.

S302: Determine an attribute of the subject.

The attribute of the subject may include, but is not limited to, a first position attribute of the subject relative to the electronic device, an orientation attribute of the subject relative to the electronic device, a second position attribute of the electronic device, and/or a type attribute of the subject.

Optionally, the first position attribute may include coordinates of the subject or a straight-line distance between the subject and each microphone in a sound pickup assembly.

Optionally, if the first position attribute is the coordinates of the subject, and the attribute of the subject is coordinates of the subject in a camera coordinate system, the electronic device may create the camera coordinate system, where the camera coordinate system is a three-dimensional coordinate system that uses an optical center of the camera as an origin and uses a principal axis as a Z-axis, a plane of the first image is parallel to an XY plane of the camera coordinate system, and an image center point of the first image is on the Z-axis of the camera coordinate system. The electronic device measures a first distance between the camera and the subject, obtains a focal length of the camera, and calculates the coordinates of the subject based on the first distance, the focal length, and the second image.

Optionally, if the first position attribute is the coordinates of the subject, and the attribute of the subject is coordinates of the subject in a camera coordinate system, the electronic device may take the first image of the subject using the shooting unit of the electronic device; determine the second image of the subject based on the first image, where the first image includes the second image, and the second image includes only the image of the subject; measure a first distance between the camera of the shooting unit and the subject based on the camera coordinate system, where the camera coordinate system is a three-dimensional coordinate system that uses an optical center of the camera as an origin and uses a principal axis as a Z-axis, a plane of the first image is parallel to an XY plane of the camera coordinate system, and an image center point of the first image is on the Z-axis of the camera coordinate system; obtain a focal length of the camera; and calculate the coordinates of the subject in the camera coordinate system based on the first distance, the focal length, and the second image.

Determining the second image of the subject based on the first image includes: receiving an object selection operation performed by the user on the first image; and marking, in the first image, an image of an object selected by the user as the second image of the subject. Alternatively, object detection and/or scene detection are/is performed on the first image, to obtain the second image of the subject.

Optionally, if the attribute of the subject is the straight-line distance between the subject and each microphone in the sound pickup assembly, the electronic device obtains coordinates of the subject and coordinates of each microphone in the sound pickup assembly in the camera coordinate system; and calculates the straight-line distance between the subject and each microphone in the sound pickup assembly based on the coordinates of the subject and the coordinates of each microphone in the sound pickup assembly. Specifically, the straight-line distance between the subject and each microphone in the sound pickup assembly may be calculated based on the coordinates of the subject and the coordinates of each microphone in the sound pickup assembly according to a formula for calculating a straight-line distance between two points.

Optionally, regarding the first position attribute, the electronic device may determine the coordinates of the subject based on sound source localization.

Optionally, the second position attribute is longitude and latitude coordinates or a location of the electronic device, and the electronic device may determine the second position attribute of the electronic device based on a global positioning system (GPS) or a BeiDou positioning system. The location of the electronic device may include a road, a shopping mall, a market, a school, or the like.

Optionally, regarding the orientation attribute, the electronic device may determine the orientation attribute of the subject based on the camera that performs the shooting operation on the subject. For example, if the electronic device performs the shooting operation on the subject by using the front-facing camera, it is determined that the subject is located on the front side of the electronic device. If the electronic device performs the shooting operation on the subject by using the rear-facing camera, it is determined that the subject is located on the back side of the electronic device.

Optionally, regarding the orientation attribute, the electronic device may alternatively calculate an orientation of the subject on the XOZ plane relative to the camera based on the coordinates of the subject in the camera coordinate system, to obtain the orientation of the subject.

Optionally, regarding the type attribute of the subject, the electronic device may create or obtain a preset type list, and search the preset type list for the type attribute of the subject, where the type attribute of the subject includes an audible type or a silent type. For example, a subject of an audible type in the preset type list includes a person, and a subject of a silent type in the preset type list includes a scenery or facility such as a mountain, a plant, or a building.

Optionally, in other embodiments, for a sound source that can produce a sound, it may be further determined whether the sound source currently produces a sound, and then a corresponding type attribute is determined. For example, regarding the type attribute of the subject, if the subject is a person, the electronic device determines whether a sound producing movement of the person is detected. If a sound producing movement of the person is detected, it is determined that the type attribute of the subject is the audible type. If a type attribute of the person in the preset type list is the silent type, and no sound producing movement of the person is detected, it is determined that the type attribute of the subject is the silent type.

Specifically, the electronic device may detect a sound producing movement of a person by detecting the mouth of the person. If the mouth of the person is moving, the electronic device determines that a sound producing movement of the person is detected. If the mouth of the person is not moving, the electronic device determines that no sound producing movement of the person is detected. Optionally, the electronic device may locate positions of the eyes and the nose based on features of the physiological structure of the face of the person; locate a position of the mouth based on the positions of the eyes and the nose; and determine whether the mouth moves, based on motion information detection and the position of the mouth. Optionally, the electronic device may detect a position of the mouth based on color information or structural features of the mouth. The electronic device may locate a plurality of organs using a color-level segmentation method, and determine the position of the mouth from the plurality of organs based on a color feature, an edge smoothing feature, and a symmetric structure feature of the mouth. The electronic device determines whether the mouth moves, based on motion information detection and the position of the mouth.

Optionally, regarding the type attribute of the subject, the electronic device may determine the type attribute of the subject based on the second position attribute. For example, if the electronic device of the subject is a road, a shopping mall, a market, a school, or the like, it is determined that the type attribute of the subject is the audible type.

S303: Select a target microphone from a sound pickup assembly based on the attribute of the subject.

The sound pickup assembly may include a microphone array formed by one microphone or a plurality of microphones. A microphone array is a system formed by a specific number of microphones to sample and process a spatial sound field. A processor in the electronic device may filter out a sound wave by using a difference between phases of audio signals received by a plurality of microphones in the microphone array, so as to remove noise and retain the sound of the subject.

Selection, turn-on, or turn-off of the sound pickup assembly may be controlled according to a preset policy. Specifically, in an embodiment of this application, the electronic device may select the target microphone from the sound pickup assembly based on the first position attribute of the subject. Specifically, coordinates of the plurality of microphones in the sound pickup assembly are obtained in the camera coordinate system; a distance between each microphone and the subject is calculated based on the coordinates of the subject and the coordinates of each microphone; and one or more microphones closest to the subject are selected from the sound pickup assembly. The coordinates of each microphone in the camera coordinate system may be determined based on a position of the microphone relative to the camera.

In an embodiment of this application, the electronic device may select the target microphone from the sound pickup assembly based on the electronic device of the subject. Specifically, the electronic device determines the location of the electronic device based on the longitude and latitude coordinates of the electronic device. If the location of the electronic device is a social location such as a shopping mall, a market, or a school, all or some microphones in the sound pickup assembly are selected as target microphones. If the location of the electronic device is a non-social location such as a road or a scenery, the sound pickup assembly is turned off.

In an embodiment of this application, the electronic device may select the target microphone from the sound pickup assembly based on the type attribute of the subject. Specifically, if the type attribute of the subject is the audible type, the electronic device selects all or some microphones in the sound pickup assembly as the target microphones. If the type attribute of the subject is the silent type, the electronic device turns off the sound pickup assembly.

In an embodiment of this application, the electronic device may select the target microphone from the sound pickup assembly based on the orientation attribute of the subject. Specifically, the electronic device may calculate an orientation of a microphone on the XOZ plane of the camera coordinate system relative to the camera, to obtain the orientation of the microphone. The electronic device selects, from the sound pickup assembly, a microphone whose orientation is consistent with the orientation of the subject.

Optionally, the electronic device includes a plurality of sides, for example, the front side, the back side, the left side, and the right side. Specifically, a first side corresponding to a camera that performs the shooting operation on the subject is obtained, and a microphone on the same side as the first side is selected from the sound pickup assembly. For example, if the camera that performs the shooting operation on the subject is a front-facing camera, the corresponding first side is the front side, and a microphone located on the front side of the electronic device is selected from the sound pickup assembly.

Figure 4:
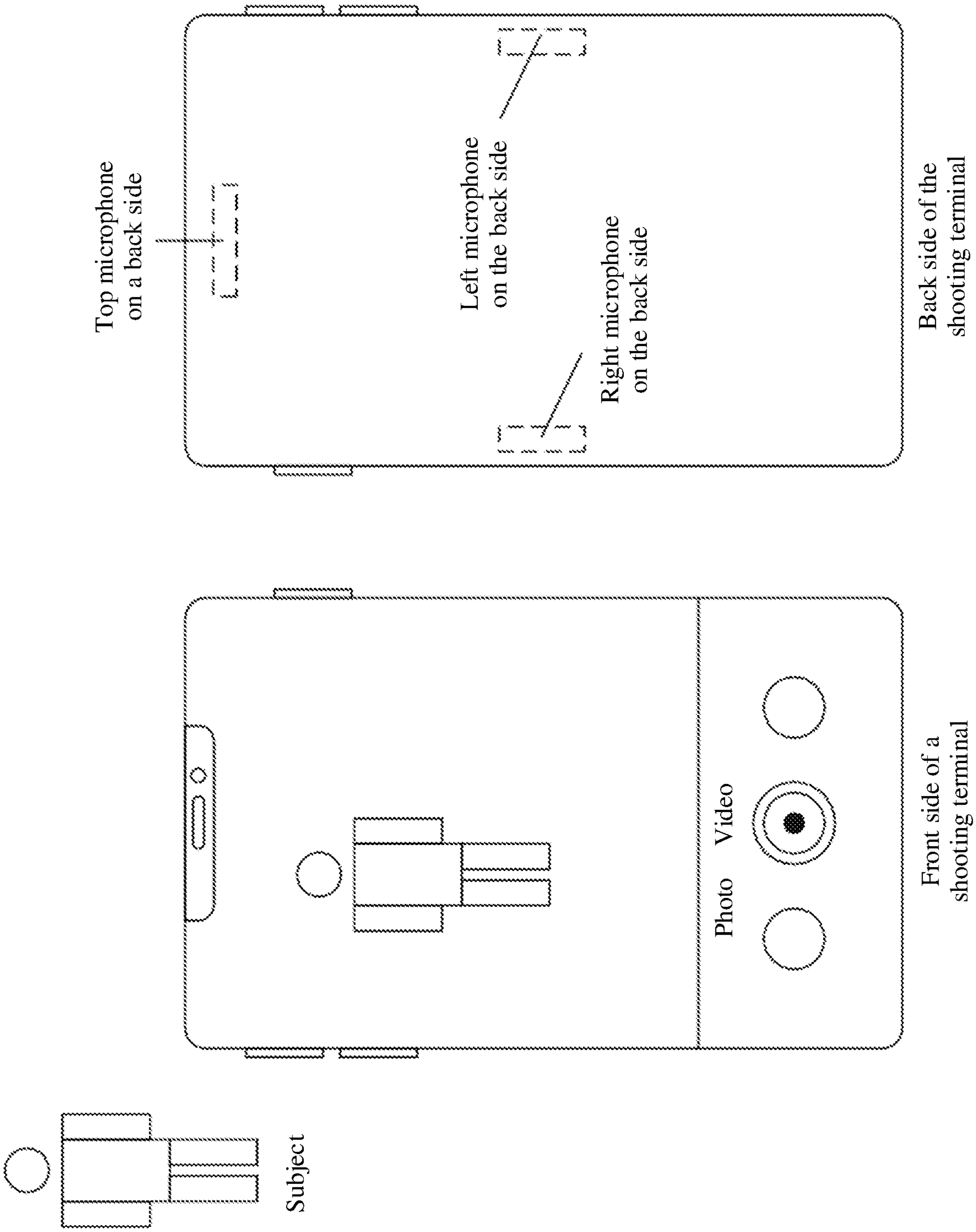
FIG. 4 to FIG. 6 are example schematic diagrams of a plurality of application scenarios of a sound recording method according to an embodiment of this application.

Optionally, a first side corresponding to a camera that performs the shooting operation on the subject is obtained; a side other than the opposite side of the first side is determined from the sound pickup assembly as a second side; and a microphone on the same side as the second side is selected. FIG. 4 is a schematic diagram of an application scenario of a sound recording method according to an embodiment of this application. If the first side corresponding to the camera that performs the shooting operation on the subject is the front side, that is, the electronic device performs the shooting operation on the subject using the front-facing camera, and the opposite side of the first side is the back side, determining the side other than the opposite side of the first side as the second side includes: determining the front side, the left side, the right side, the top side, and the bottom side as the second sides, and selecting microphones on the second sides (for example, the front side, the left side, the right side, the top side, and the bottom side of the electronic device) from the sound pickup assembly.

Optionally, the subject may include a first sub-subject and a second sub-subject. The electronic device selects a microphone corresponding to the first sub-subject and a microphone corresponding to the second sub-subject from the sound pickup assembly. Specifically, the electronic device may select the microphone corresponding to the first sub-subject and the microphone corresponding to the second sub-subject from the sound pickup assembly based on the first position attribute, the orientation attribute, the type attribute, and/or the second position attribute of the electronic device.

Optionally, the electronic device may select the target microphone from the sound pickup assembly based on the first position attribute and the orientation attribute of the subject. Specifically, the electronic device may select a first microphone group from the sound pickup assembly based on the first position attribute of the subject, and obtain a first volume of noise and a second volume of the subject using the first microphone group. If the first volume is greater than or equal to the second volume, the electronic device determines, based on the orientation attribute of the subject, the first side corresponding to the camera that performs the shooting operation on the subject, determines a third side corresponding to the noise relative to the electronic device, and determines a side other than the third side as a fourth side. The electronic device selects, from the first microphone group, a microphone on the same side as the first side or a microphone on the same side as the third side. For example, the subject is a building, and the electronic device is a mobile phone. The mobile phone may select a first microphone group from the sound pickup assembly based on a first position attribute of the building, where the first microphone group may include microphones in a plurality of orientations. A first volume of road noise and a second volume of the building are obtained using the first microphone group. If the first volume is greater than or equal to the second volume, the mobile phone determines, based on an orientation attribute of the building, a first side (for example, a side on which a front-facing camera of the mobile phone is located, that is, the front side of the mobile phone) corresponding to a camera that performs a shooting operation on the building, determines a third side (for example, the right side of the mobile phone) corresponding to the road noise relative to the mobile phone, and determines a fourth side (for example, the front side, the back side, the left side, the top side, and the bottom side of the mobile phone) other than the third side. The electronic device selects a microphone on the front side of the mobile phone, or microphones on the front side, the back side, the left side, the top side, and the bottom side of the mobile phone from the first microphone group.

Figure 5:
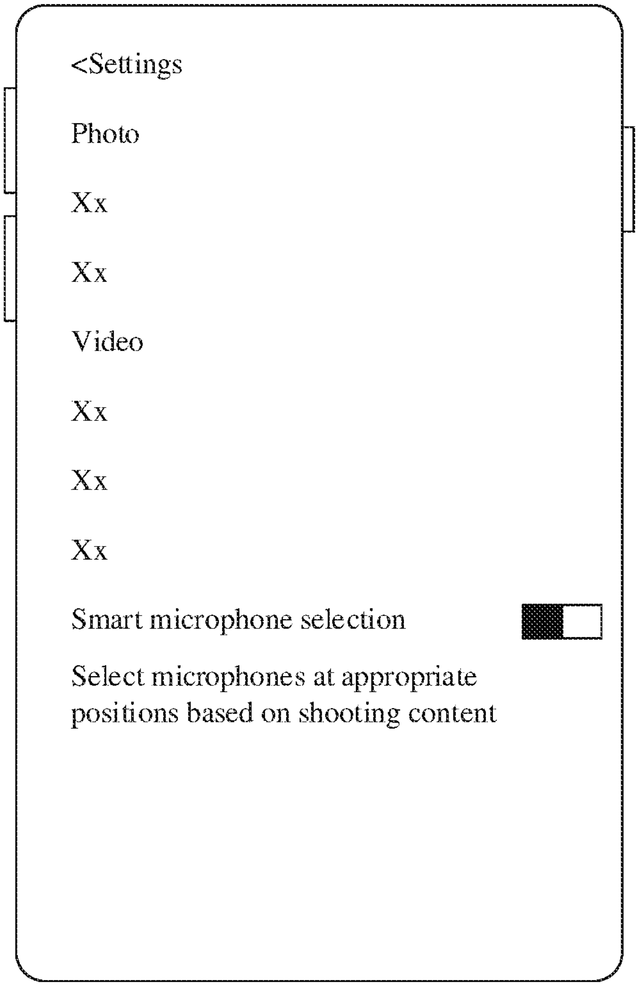

Optionally, the electronic device displays a microphone control interface; and in response to a turn-on operation by the user on a smart microphone control icon in the microphone control interface, selects, from the sound pickup assembly based on the attribute of the subject, a target microphone corresponding to a smart microphone control icon in an on state. As shown in FIG. 5, the user may enable or disable a smart microphone selection function by tapping a control icon for smart microphone selection.

Optionally, the electronic device may select a plurality of microphones from the sound pickup assembly based on the attribute of the subject.

Optionally, the electronic device may select the target microphone from the sound pickup assembly in real time in response to a change of the first position attribute of the subject.

S304: Perform sound recording on the subject using the target microphone.

Figure 6:
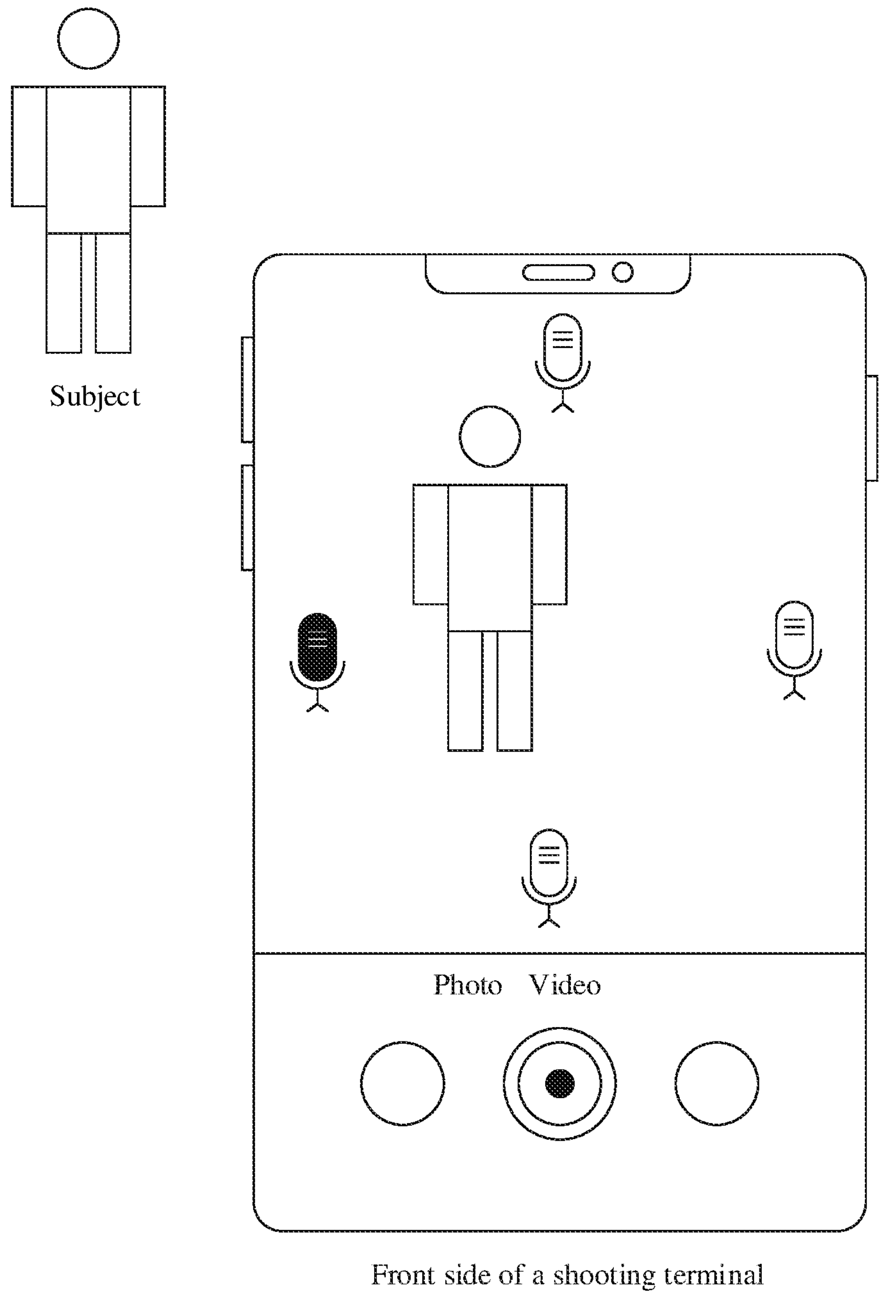

In an embodiment of this application, the electronic device may display a microphone control interface. In response to a control operation by the user on the target microphone or the sound pickup assembly, the electronic device performs on/off control on the target microphone or the sound pickup assembly according to the control operation, and performs sound recording on the subject using the target microphone or the sound pickup assembly in an on state. As shown in FIG. 6, icons of four microphones are displayed according to positions of the microphones on the mobile phone. Currently, the left microphone picks up a sound, and the other microphones do not pick up a sound. The user may tap the microphone that is picking up a sound to turn off the microphone that is picking up a sound, or tap a microphone in an off state to turn on the microphone in the off state to pick up a sound.

Optionally, if the subject is a person, the electronic device may extract a face image of the person; calculate a target similarity between the face image of the person and a preset face image stored in the electronic device; obtain a preset similarity; and if the target similarity is greater than the preset similarity, perform sound recording on the subject using the target microphone; or if the target similarity is less than or equal to the preset similarity, filter out a sound of the subject using the target microphone.

Optionally, during the sound recording on the subject using the target microphone, the sound recording method further includes:

- determining, by the electronic device, a to-be-suppressed sound based on the subject and/or a shooting scene; and filtering out the to-be-suppressed sound.

Optionally, the electronic device may determine the sound of the subject; determine whether a sound acquired is the sound of the subject; and if the sound acquired is not the sound of the subject, filter out the sound acquired. The electronic device may determine, based on a timbre or a voiceprint, whether the sound acquired is the sound of the subject.

Optionally, the subject includes a first sub-subject and a second sub-subject, the target microphone includes a first sub-microphone and a second sub-microphone, and the electronic device determines to perform sound recording on the first sub-subject using the first sub-microphone, and to perform sound recording on the second sub-subject using the second sub-microphone. Based on voiceprint or timbre recognition, the electronic device filters out a sound of the second sub-subject for the first sub-microphone, and the electronic device filters out a sound of the first sub-subject for the second sub-microphone.

Optionally, the electronic device may obtain a preset to-be-suppressed sound; determine whether a sound acquired matches the preset to-be-suppressed sound; and if the sound acquired matches the preset to-be-suppressed sound, filter out the sound acquired. The electronic device may determine, based on a timbre or a voiceprint, a sound that matches preset noise.

Optionally, the electronic device may obtain a preset frequency range; determine whether a frequency of a sound acquired exceeds the preset frequency range; and if the frequency of the sound acquired exceeds the preset frequency range, filter out the sound acquired.

Optionally, the electronic device may obtain a shooting scene; obtain a preset scene frequency range table; and search the preset scene frequency range table for the preset frequency range according to the shooting scene. For example, in the preset scene frequency range table, a frequency range corresponding to a street shooting scene is 0 Hz to 1,000 Hz; a frequency range corresponding to a station shooting scene is 50 Hz to 1,500 Hz; a frequency range corresponding to an office shooting scene is 100 Hz to 2,000 Hz; and a frequency range corresponding to a home shooting scene is 300 to 1,500 Hz.

Optionally, the electronic device may perform sound synthesis on audio signals acquired by a plurality of microphones in the target microphones. When the sound synthesis is performed on the audio signals acquired by the plurality of microphones, the to-be-suppressed sound may be filtered out.

Figure 7:
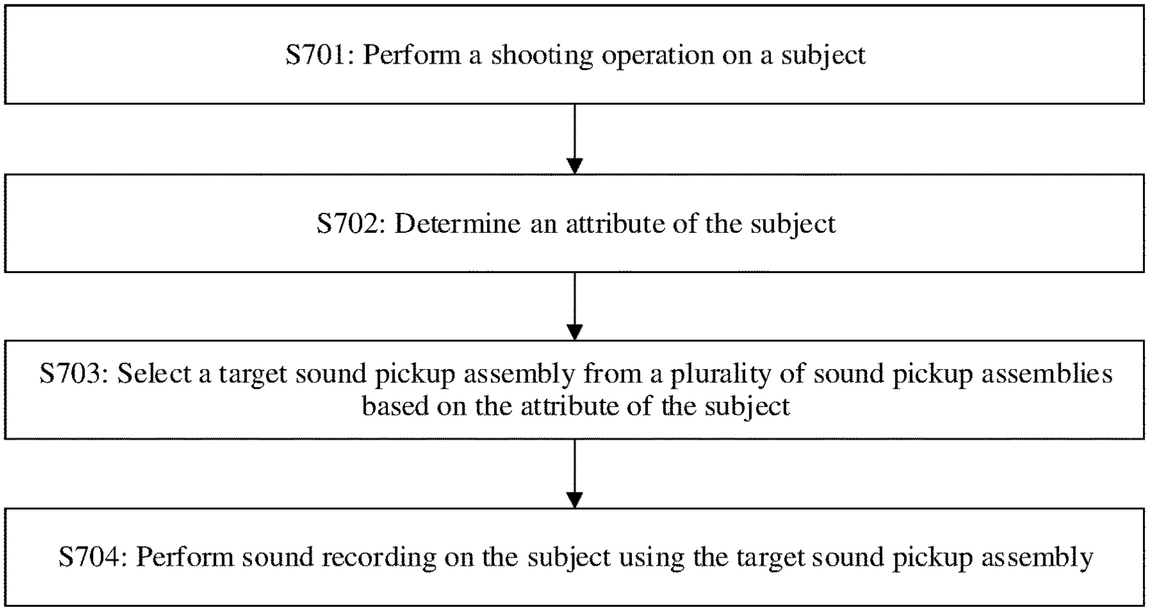
FIG. 7 is an example flowchart of another sound recording method according to an embodiment of this application.

FIG. 7 is an example flowchart of a sound recording method according to an embodiment of this application.

S701: Perform a shooting operation on a subject.

The electronic device may obtain a first image through a shooting unit, and perform image recognition on the first image obtained by the shooting unit, to obtain a second image of the subject in the first image.

In an embodiment of this application, the shooting unit includes a plurality of cameras of a plurality of devices.

When recording a video of a child, a parent may turn on a camera of a mobile phone to perform a pre-shooting operation on the child, to obtain a first image including the child. If the parent shoots a video of the child playing sports from behind the child, the mobile phone usually cannot clearly acquire a sound of the child.

S702: Determine an attribute of the subject.

In an embodiment of this application, the attribute of the subject includes a first position attribute of the subject and/or a second position attribute of the electronic device.

Optionally, the first position attribute of the subject may include a position attribute value such as a living room, a study, a bedroom, or the inside of a vehicle.

Optionally, the electronic device may determine, based on the global positioning system or the BeiDou positioning system, that the second position attribute is longitude and latitude coordinates of the electronic device or a location of the electronic device.

Optionally, the electronic device may determine the second position attribute of the electronic device based on a ultra-wideband (UWB) indoor positioning method, an radio frequency identification (RFID) positioning method, a ZigBee indoor positioning method, an ultrasonic positioning method, or a Wi-Fi positioning method.

The electronic device may obtain signal strengths of the electronic device relative to a plurality of routers, and select a position of a router with a greatest signal strength as the second position attribute. The electronic device may obtain distances and angles of the electronic device relative to the plurality of routers, and determine the second position attribute of the electronic device based on the distances and angles of the electronic device relative to the plurality of routers. The electronic device may obtain a mapping table of a position and signal characteristics, obtain signal characteristics at a current position, and query the mapping table of a position and signal characteristics for the current position based on the signal characteristics of the current position.

S703: Select a target sound pickup assembly from a plurality of sound pickup assemblies of a plurality of sound pickup electronic devices based on the attribute of the subject.

In an embodiment of this application, the electronic device is communicatively connected to a plurality of sound pickup electronic devices provided with sound pickup assemblies, and the electronic device obtains, based on the position of the subject, distances between the subject and the plurality of sound pickup electronic devices. A sound pickup assembly closest to the subject is selected from the sound pickup assemblies of the plurality of sound pickup electronic devices. The sound pickup assemblies and the target sound pickup assembly include one or more microphones. For example, the subject is a shooting user, and the plurality of sound pickup electronic devices are successively a headset, smart glasses, a smart watch, and a terminal device according to the ascending order of their distances from the subject. The electronic device may select the headset as the target sound pickup assembly.

Optionally, the electronic device includes a vehicle.

Figure 8:
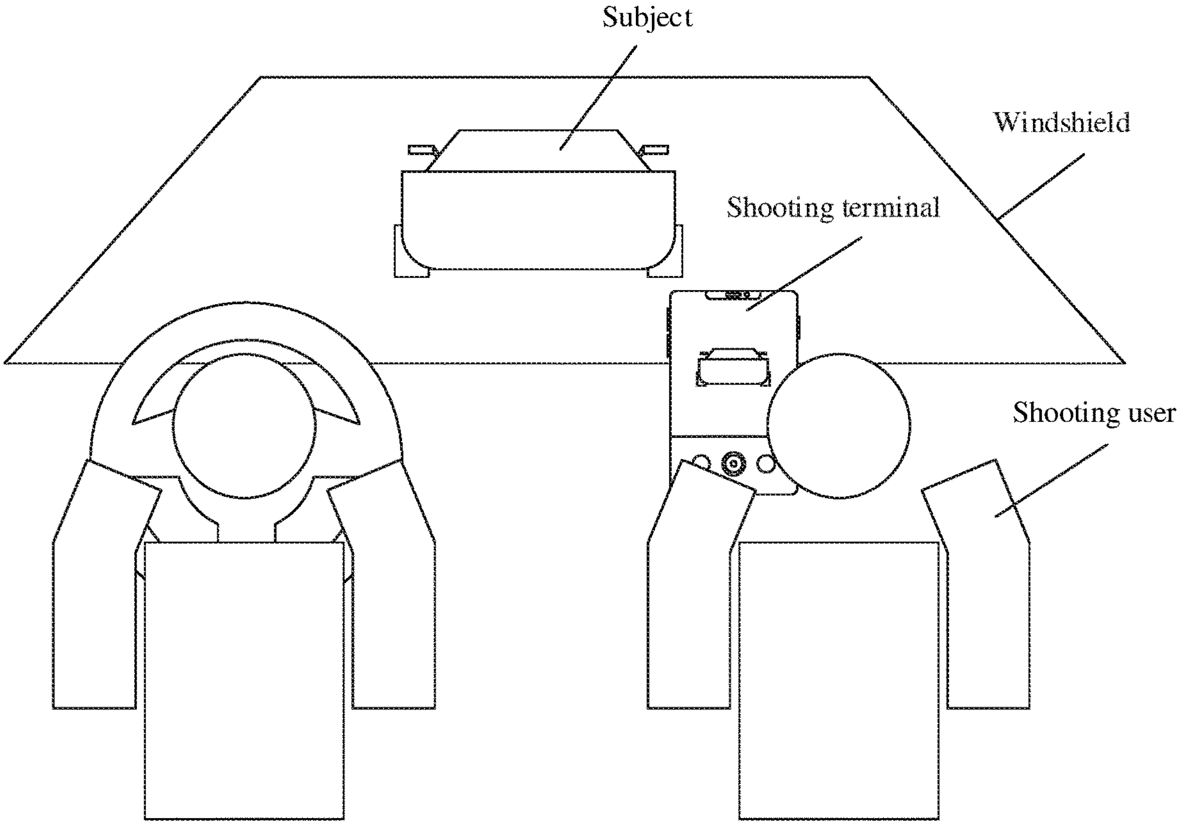
FIG. 8 to FIG. 10 are example schematic diagrams of a plurality of application scenarios of a sound recording method according to an embodiment of this application.

As shown in FIG. 8, a shooting user inside the vehicle performs a shooting operation on a subject outside the vehicle using a mobile phone communicatively connected to the vehicle. The mobile phone may invoke a microphone of the vehicle to pick up a sound of the subject.

Figure 9:
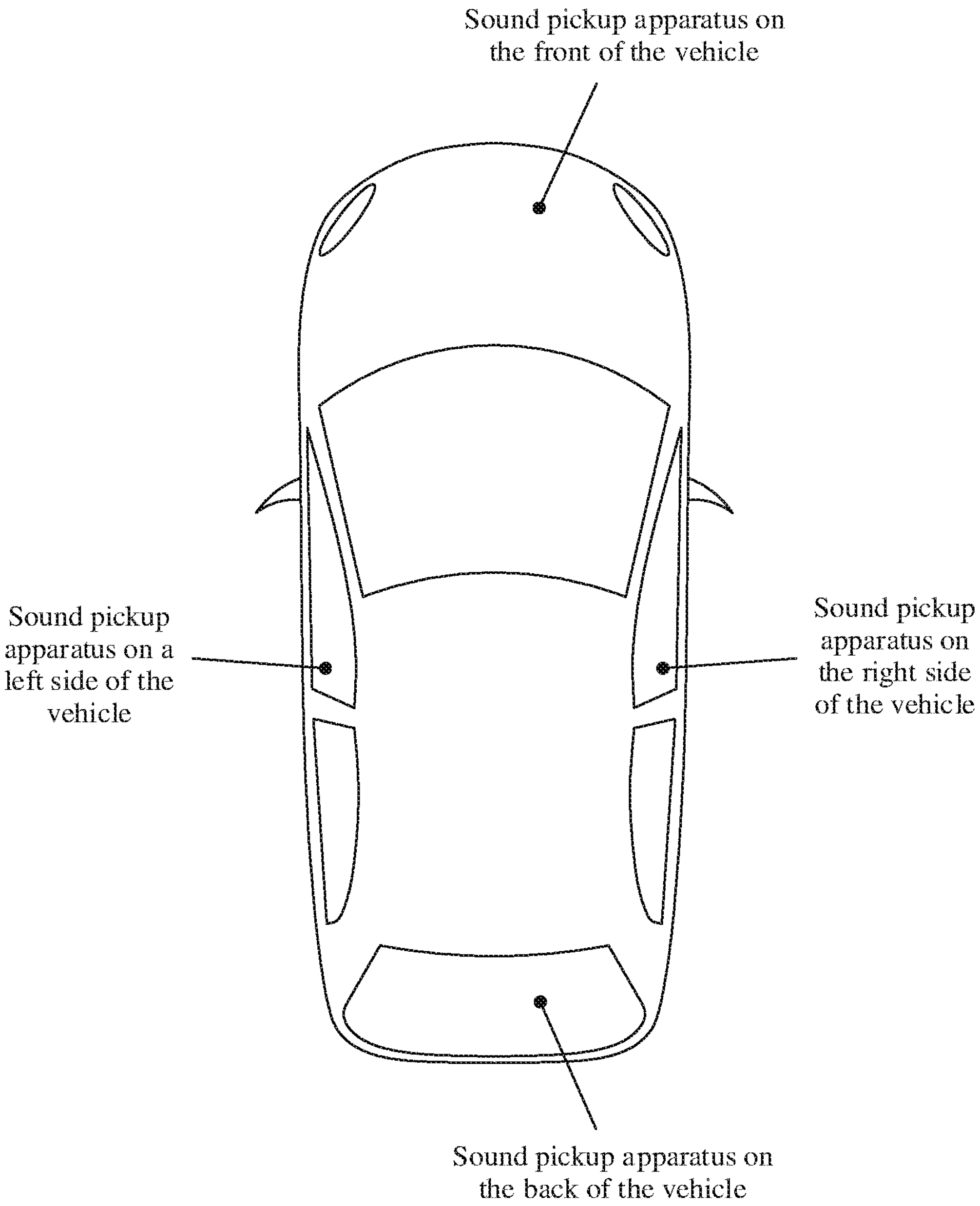

Optionally, if the vehicle is used as a sound pickup electronic device, the electronic device may determine a heading direction of the vehicle based on positioning information of the electronic device. The electronic device determines a shooting direction based on a motion sensor; determines a sound pickup direction of the vehicle based on the heading direction and the shooting direction; and determines, based on the sound pickup direction of the vehicle, a target sound pickup assembly corresponding to the sound pickup direction. FIG. 9 is a schematic diagram of a plurality of microphones on a vehicle.

Figure 10:
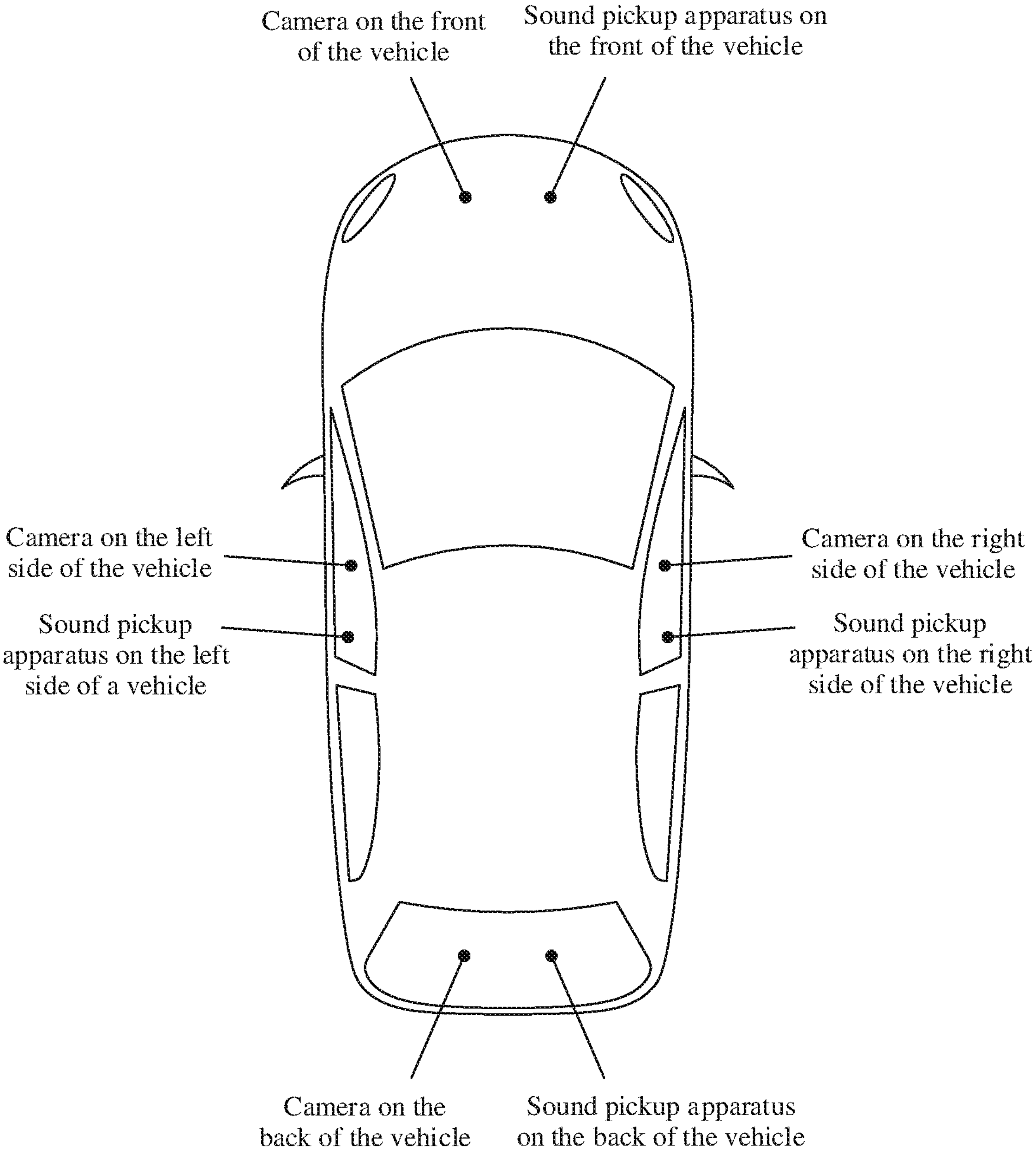

Optionally, if the vehicle is used as a sound pickup electronic device, the electronic device obtains a third image using a shooting unit of the vehicle; determines whether the first image is similar to the third image; if the first image is similar to the third image, determines a shooting direction of a camera that shoots the third image; and selects, based on the shooting direction, a target sound pickup assembly from a plurality of sound pickup assemblies of the vehicle. As shown in FIG. 10, the vehicle may include cameras in four shooting directions, the camera in each shooting direction is associated with one microphone, and the vehicle stores an association relationship between the camera and the microphone. The vehicle may select, based on the association relationship between the camera and the microphone, a microphone whose direction is consistent with the shooting direction of the camera that obtains the image.

Optionally, if the vehicle is used as a sound pickup electronic device, the electronic device obtains a third image using a shooting unit of the vehicle. The electronic device or the vehicle performs image recognition on the third image to obtain a fourth image of a subject in the third image; determines whether the second image is similar to the fourth image; if the second image is similar to the fourth image, determines a shooting direction of a camera that shoots the third image; and selects, based on the shooting direction, a target sound pickup assembly from a plurality of sound pickup assemblies of the vehicle.

Optionally, if the vehicle is used as a sound pickup electronic device, the electronic device obtains an image set using a shooting unit of the vehicle; selects a third image from the image set based on a similarity between an image and the first image; determines a shooting direction of a camera of the vehicle that shoots the third image; and selects, based on the shooting direction, a target sound pickup assembly from a plurality of sound pickup assemblies of the vehicle.

Optionally, the first position attribute of the subject may include a position attribute value such as a living room, a study, a bedroom, or a vehicle. The electronic device may obtain a mapping table of a preset position and a sound pickup device; and query the mapping table of a preset position and a sound pickup device for a sound pickup electronic device based on the position attribute value of the first position attribute of the subject. For example, in the mapping table of a preset position and a sound pickup device, the living room (e.g., a position attribute) is mapped to a television (e.g., a sound pickup device), the study (e.g., a position attribute) is mapped to a computer (e.g., a sound pickup device), the bedroom (e.g., a position attribute) is mapped to a tablet (e.g., a sound pickup device), and the vehicle (e.g., a position attribute) is mapped to a headset or an in-vehicle microphone (e.g., a sound pickup device).

Optionally, if the target sound pickup assembly includes microphones of a plurality of sound pickup electronic devices, an order of the plurality of sound pickup electronic devices in a preset sound pickup device list is obtained; and the electronic device selects a microphone of one electronic device from microphones of the plurality of sound pickup electronic devices according to the order of the plurality of sound pickup electronic devices. The order of the sound pickup electronic devices in the preset sound pickup device list may be: the headset—the mobile phone—the tablet—the computer—the television.

S704: Perform sound recording on the subject using the target sound pickup assembly.

Optionally, the electronic device may perform sound recording on the subject using microphones of one or more sound pickup electronic devices.

In an embodiment of this application, after the sound recording is performed on the subject using the target sound pickup assembly, the sound recording method further includes:

combining, by the electronic device into a video file, an audio signal acquired by the target sound pickup assembly and a video signal captured by a shooting unit.

Optionally, the electronic device may acquire an audio signal in each time period using one sound pickup electronic device. The electronic device combines audio signals in all time periods into a target audio signal according to a time sequence, and combines the target audio signal and the video signal captured by the camera into a video file.

Optionally, the electronic device may acquire audio signals in each time period using the plurality of sound pickup electronic devices. The electronic device may select one audio signal from the plurality of audio signals in each time period based on sound characteristics, to obtain a plurality of selected audio signals; combine the plurality of selected audio signals into a target audio signal according to a time sequence; and combine the target audio signal and the video signal captured by the camera into a video file. The electronic device may select one audio signal from the plurality of audio signals in each time period based on sound characteristics such as a volume, a voiceprint feature, or a video matching degree.

The task of voiceprint feature extraction is to extract and select acoustic or linguistic features that have strong separability and high stability in relation to a voiceprint of a speaker, including: (1) acoustic features (such as spectrum, cepstrum, formant, fundamental frequency, and reflection coefficients) related to the anatomical structure of a human sound producing mechanism, nasal sounds, deep breathing sounds, hoarseness, laughter, and the like; (2) semantic, rhetorical, pronunciation, and speech habits affected by social and economic status, education level, birthplace, and the like; and (3) personal characteristics or features such as rhythm, tempo, speed, intonation, and volume affected by parents. From the perspective of modeling by using a mathematical method, features that can be used by an automated voiceprint recognition model include: (1) acoustic features (cepstrum); (2) lexical features (speaker-related words and phonemes); (3) prosodic features; (4) language, dialect, and accent information; and (5) channel information (a type of a channel used).

Figure 11:
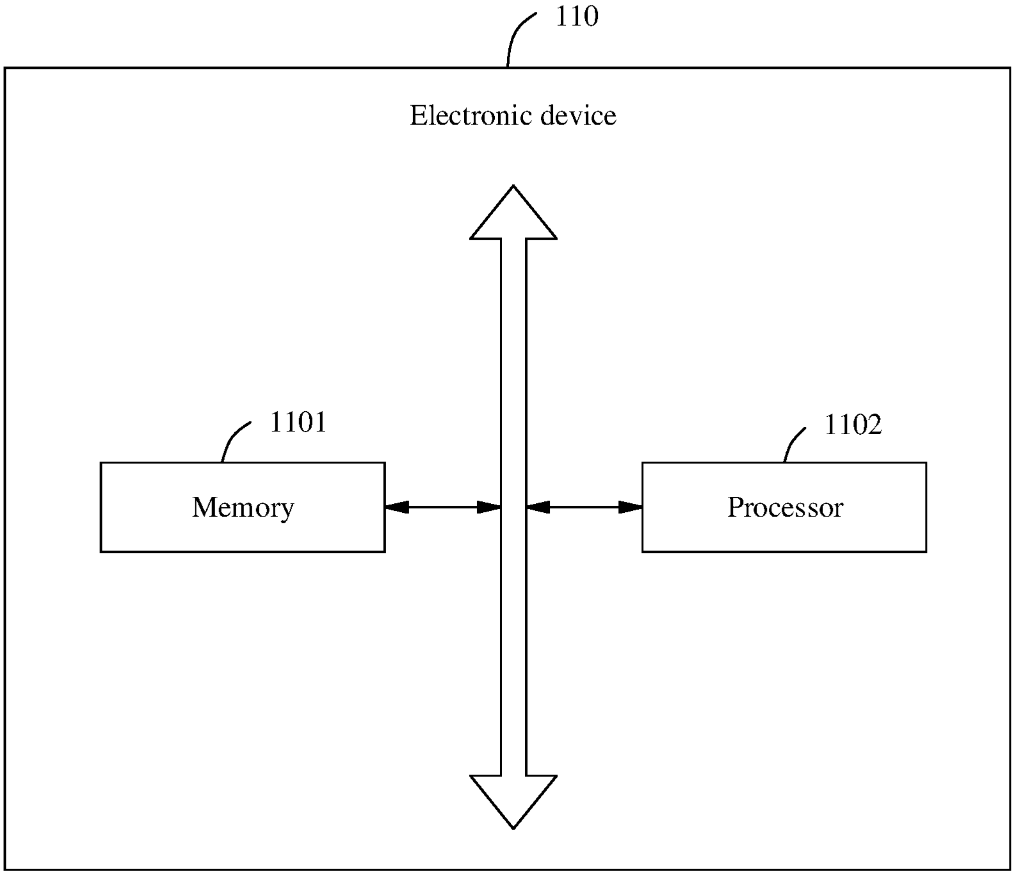
FIG. 11 is an example schematic diagram of an electronic device according to an embodiment of this application.

FIG. 11 is a schematic diagram of an electronic device 110 according to an embodiment of this application. The electronic device 110 includes a memory 1101, a processor 1102, and computer-readable instructions, such as a sound recording program, stored in the memory 1101 and executable on the processor 1102. When the processor 1102 performs the computer-readable instructions, the steps in the foregoing sound recording method embodiment are implemented.

A person skilled in the art may understand that the schematic diagram FIG. 11 is merely an example of the electronic device 110, and does not constitute a limitation on the electronic device 110. The electronic device 110 may include more or fewer components than those shown in the figure, or a combination of some components, or different components. For example, the electronic device 110 may further include an input/output device, a network access device, a bus, and the like.

The processor 1102 may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor. Alternatively, the processor 1102 may be any conventional processor. The processor 1102 is a control center of the electronic device 110, and connects parts of the entire electronic device 110 via various interfaces and lines.

The memory 1101 may be configured to store the computer-readable instructions. The processor 1102 implements various functions of the electronic device 110 by running or executing the computer-readable instructions or modules stored in the memory 1101 and invoking data stored in the memory 1101. The memory 1101 may mainly include a program storage area and a data storage area. The program storage area may store an operating system, an application program required by at least one function (such as a sound playing function or an image playing function), and the like. The data storage area may store data created based on use of the electronic device 110. In addition, the memory 1101 may include a hard disk, a memory, a plug-in hard disk, a smart media card (SMC), a secure digital (SD) card, a flash memory card (Flash Card), at least one magnetic disk storage device, a flash memory device, a read-only memory (ROM), a random access memory (RAM), or another non-volatile/volatile storage device.

When the modules integrated into the electronic device 110 are implemented in the form of software functional modules and sold or used as an independent product, the modules may be stored in a computer-readable storage medium. Based on such an understanding, in this application, all or some of the procedures of the method in the foregoing embodiments may be implemented by computer-readable instructions instructing relevant hardware. The computer-readable instructions may be stored in a computer-readable storage medium. When the computer-readable instructions are executed by a processor, the steps in the foregoing method embodiments may be implemented. The computer-readable instructions include computer-readable instruction code. The computer-readable instruction code may be in the form of source code, object code, an executable file, an intermediate form, or the like. The computer-readable medium may include any entity or apparatus that can carry the computer-readable instruction code, a recording medium, a USB flash drive, a removable hard disk, a magnetic disk, an optical disc, a computer memory, a read-only memory, a random access memory, or the like.

Figure 12:
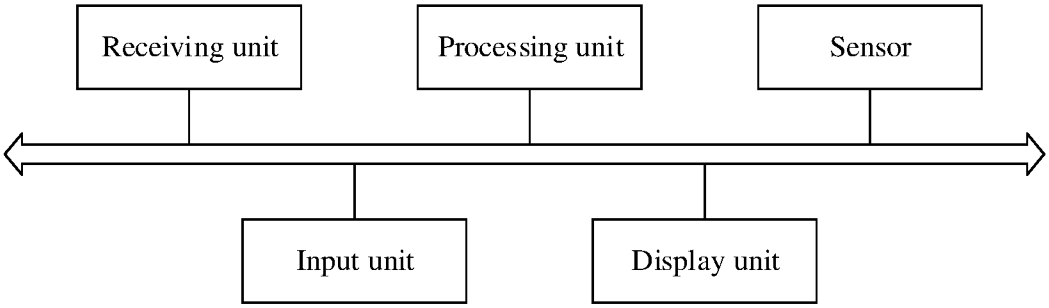
FIG. 12 is an example schematic apparatus diagram of an electronic device according to an embodiment of this application.

FIG. 12 is a schematic apparatus diagram of an electronic device according to an embodiment of this application. The electronic device includes a receiving unit, a processing unit, a sensor, an input unit, and a display unit. A user inputs indication information using the input unit. The receiving unit receives the indication information from the user. The sensor includes one or more sensors connected to the electronic device, including a camera, a microphone, and the like. The processing unit processes data transferred by the sensor in real time. The display unit displays corresponding content through a display screen.

An embodiment further provides a computer storage medium. The computer storage medium stores computer instructions that, when executed on an electronic device, cause the electronic device to perform the foregoing related method steps to implement the sound recording method in the foregoing embodiments.

An embodiment further provides a computer program product that, when running on an electronic device, causes the electronic device to perform the foregoing related steps to implement the sound recording method in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to cause the chip to perform the sound recording method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above.

The description of the foregoing implementations allows a person skilled in the art to clearly understand that, for the purpose of convenient and brief description, division of the foregoing functional modules is taken as merely an example for illustration. In actual application, the foregoing functions can be allocated to and implemented by different modules according to needs, that is, an inner structure of an apparatus is divided into different functional modules to implement all or some of the functions described above.

In the several embodiments provided in this application, it should be understood that the apparatus and method disclosed may be implemented in other manners. For example, the apparatus embodiments described above are merely examples. For example, the division into the modules or units is merely a logical function division, and may be another division in an actual implementation. For example, a plurality of units or components may be combined or may be integrated into another apparatus, or some features may be ignored or not be performed. In addition, the mutual coupling or direct coupling or communication connection shown or discussed may be indirect coupling or communication connection through some interfaces, apparatuses, or units, and may be in electrical, mechanical, or other forms.

The units described as separate parts may or may not be physically separate, and parts displayed as units may be one or more physical units, may be located in one place, or may be distributed on different places. Some or all of the units may be selected based on actual needs to achieve the objectives of the solutions of the embodiments.

In addition, the functional units in embodiments of this application may be integrated into one processing unit, or each of the units may exist alone physically, or two or more units are integrated into one unit. The above integrated unit may be implemented either in the form of hardware or in the form of software functional units.

When the integrated unit is implemented in the form of a software functional unit and sold or used as an independent product, the integrated unit may be stored in a readable storage medium. Based on such an understanding, the technical solutions of embodiments of this application, in essence or the part contributing to the prior art, or all or some of the technical solutions may be embodied in the form of a software product. The software product is stored in a storage medium and includes a number of instructions that cause a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A sound recording method applied to an electronic device, the sound recording method comprising:
- determining an attribute of the subject;
- selecting a target microphone, from a sound pickup assembly, based on the attribute of the subject; and
- performing sound recording on the subject using the selected target microphone, wherein
- the subject includes a first sub-subject and a second sub-subject,
- the target microphone includes a first sub-microphone and a second sub-microphone, and
- performing the sound recording on the subject includes:
  - performing sound recording on the first sub-subject using the first sub-microphone; and
  - performing sound recording on the second sub-subject using the second sub-microphone.

2. The sound recording method according to claim 1, wherein the attribute of the subject includes any of:
- a first position attribute of the subject relative to the electronic device,
- an orientation attribute of the subject relative to the electronic device,
- a second position attribute of the electronic device, and/or
- a type attribute of the subject.

3. The sound recording method according to claim 2, wherein the first position attribute includes: coordinates of the subject or a straight-line distance between the subject and each microphone in the sound pickup assembly.

4. The sound recording method according to claim 3, wherein in association with the first position attribute being the coordinates of the subject, determining the attribute of the subject comprises:
- shooting a first image of the subject using a shooting device of the electronic device;
- determining a second image of the subject based on the first image, wherein the first image includes the second image;
- measuring, based on a camera coordinate system, a first distance between a camera of the shooting device and the subject, wherein
  - the camera coordinate system includes a three-dimensional coordinate system using an optical center of the camera as an origin and a principal axis as a Z-axis,
  - a plane of the first image is parallel to an XY plane of the camera coordinate system, and
  - an image center point of the first image is on the Z-axis of the camera coordinate system;
- obtaining a focal length of the camera; and
- calculating the coordinates of the subject, in the camera coordinate system, based on the first distance, the focal length, and the second image.

5. The sound recording method according to claim 4, wherein determining the second image of the subject based on the first image comprises:
- receiving an object selection operation performed by a user on the first image; and
- marking, in the first image, an image of the object selected by the user as the second image of the subject.

6. The sound recording method according to claim 4, wherein determining the second image of the subject based on the first image comprises:
- obtaining the second image of the subject by performing object detection and/or scene detection on the first image.

7. The sound recording method according to claim 4, wherein in association with the first position attribute being the straight-line distance between the subject and each microphone in the sound pickup assembly, determining the attribute of the subject comprises:
- obtaining the coordinates of the subject and coordinates of each microphone in the sound pickup assembly in the camera coordinate system; and
- calculating the straight-line distance between the subject and each microphone in the sound pickup assembly based on the obtained coordinates of the subject and the obtained coordinates of each microphone in the sound pickup assembly.

8. The sound recording method according to claim 2, wherein in association with the attribute of the subject being the orientation attribute, determining the attribute of the subject comprises:
- determining the orientation attribute of the subject using a camera performing a shooting operation on the subject.

9. The sound recording method according to claim 2, wherein in association with the attribute of the subject being the type attribute, determining the attribute of the subject comprises:
- creating or obtaining a type list; and
- searching the type list for the type attribute of the subject, wherein the type attribute of the subject includes an audible type or a silent type, and in association with the subject being a person, searching the type list for the type attribute of the subject comprises:

determining whether a sound producing movement of the person is detected; and in association with a sound producing movement of the person being detected, determining the type attribute of the subject is the audible type; or in association with no sound producing movement of the person being detected, and a type attribute of the person in the type list is the silent type, determining that the type attribute of the subject is the silent type.

10. The sound recording method according to claim 2, wherein in association with the attribute of the subject being the type attribute, determining the attribute of the subject comprises:

determining the type attribute of the subject based on the second position attribute.

11. The sound recording method according to claim 1, wherein selecting the target microphone from the sound pickup assembly based on the attribute of the subject comprises:

selecting the target microphone from the sound pickup assembly based on the first position attribute of the subject;

selecting the target microphone from the sound pickup assembly based on the electronic device of the subject;

selecting the target microphone from the sound pickup assembly based on the type attribute of the subject; or selecting the target microphone from the sound pickup assembly based on the orientation attribute of the subject.

12. The sound recording method according to claim 1, wherein selecting the target microphone from the sound pickup assembly based on the attribute of the subject comprises:

obtaining a first side corresponding to a camera performing a shooting operation on the subject; and selecting, from the sound pickup assembly, a microphone on a same side as the first side as the target microphone.

13. The sound recording method according to claim 1, wherein selecting the target microphone from the sound pickup assembly based on the attribute of the subject comprises:

obtaining a first side corresponding to a camera performing a shooting operation on the subject;

determining, from the electronic device, a side other than an opposite side of the first side as a second side; and selecting a microphone on a same side as the second side as the target microphone.

14. The sound recording method according to claim 1, wherein selecting the target microphone from the sound pickup assembly based on the attribute of the subject comprises:

selecting the target microphone from the sound pickup assembly based on the first position attribute and the orientation attribute of the subject.

15. An electronic device, comprising:

at least one processor; and at least one processor memory coupled to the at least one processor and configured to store program instructions, which when executed by the processor, cause the electronic device to:

determine an attribute of the subject;

select a target microphone from a sound pickup assembly based on the attribute of the subject, wherein the subject includes a first sub-subject and a second sub-subject, and the target microphone includes a first sub-microphone and a second sub-microphone:

perform sound recording on the first sub-subject using the first sub-microphone; and perform sound recording on the second sub-subject using the second sub-microphone.

* * * * *